G. L. BLANCHARD.
ORCHARD HEATER.
APPLICATION FILED JUNE 11, 1919.
1,373,647.
Patented Apr. 5, 1921.
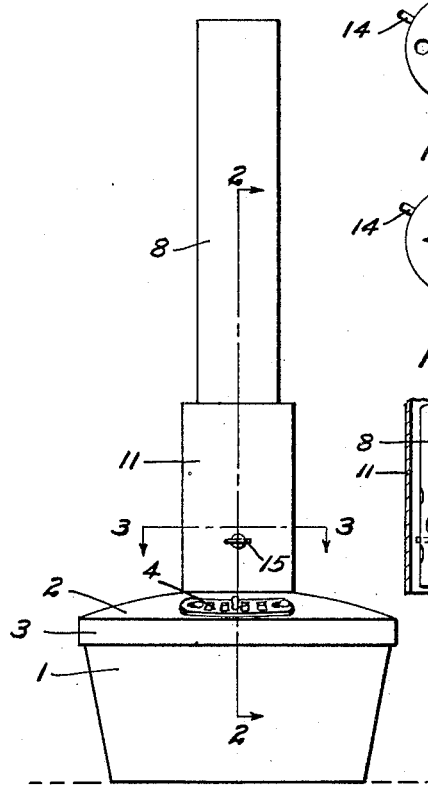
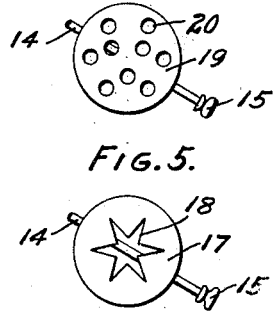
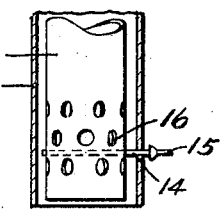
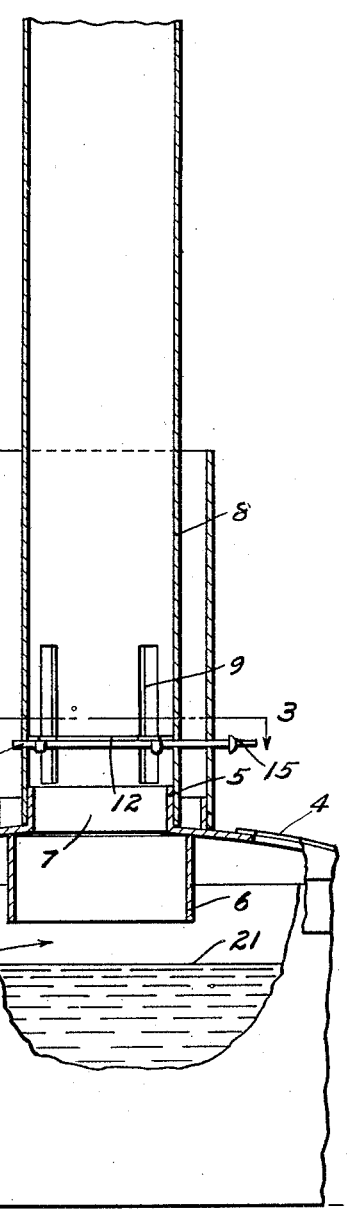
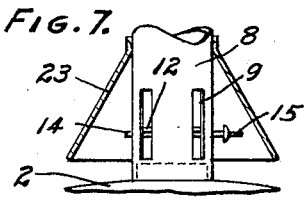
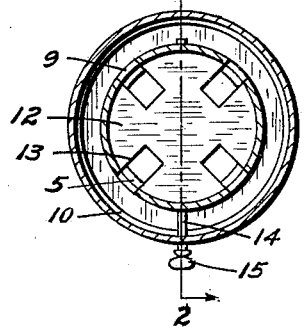
INVENTOR
GEORGE L. BLANCHARD
BY Hazard & Miller
ATT'YS.

UNITED STATES PATENT OFFICE.

GEORGE L. BLANCHARD, OF POMONA, CALIFORNIA.

ORCHARD-HEATER.

1,373,647.   Specification of Letters Patent.   Patented Apr. 5, 1921.

Application filed June 11, 1919. Serial No. 303,464.

*To all whom it may concern:*

Be it known that I, GEORGE L. BLANCHARD, a citizen of the United States, residing at Pomona, in the county of Los Angeles and State of California, have invented new and useful Improvements in Orchard-Heaters, of which the following is a specification.

My object is to make an improved orchard heater, and my invention consists of the novel features herein shown, described and claimed.

Figure 1 is a side elevation of an orchard heater embodying the principles of my invention.

Fig. 2 is a fragmentary sectional elevation on the lines 2—2 of Figs. 1 and 3.

Fig. 3 is a horizontal sectional detail on the lines 3—3 of Figs. 1 and 2 and looking downwardly.

Fig. 4 is a fragmentary sectional detail showing a modified form of air inlets.

Fig. 5 is a plan showing a modified form of the smoke consumer.

Fig. 6 is a plan showing a second modification of the smoke consumer.

Fig. 7 is a view analogous to Fig. 2 upon a reduced scale and showing a modified construction.

Referring to the drawing in detail, the tub 1 is made of heavy sheet iron, and the cover 2 fits the tub 1 and has a flange 3 extending downwardly around the upper edge of the tub. A draft regulator 4 is formed through the cover 2 at one side of the center, an outlet nipple 5 extends upwardly from the center of the cover 2, and a baffle 6 extends downwardly from the cover around the outlet nipple opening 7, so that the draft passing inwardly through the air regulator 4 must pass downwardly around the baffle and then upwardly through the nipple 5.

The up-draft smoke stack 8 fits upon the nipple 5 and has radial vertically elongated openings 9 extending from just above the nipple 5, so that in forming the openings 9 an unbroken band is left around the lower end of the smoke stack 8 to fit tightly upon the nipple 5. A second nipple 10 extends upwardly from the cover 2 concentric to the nipple 5 and the down draft flue 11 fits upon the nipple 10. The smoke consumer 12 is mainly circular and flat and has radial notches 13 extending inwardly from its periphery in registration with the openings 9. The smoke consumer 12 is mounted in the up-draft smoke stack 8 about one-third of the length of the openings 9 up from the lower ends of the openings. The stem 14 extends through the down draft flue 11 and through the up-draft smoke stack 8 and is fixed to the smoke consumer 12 to form a pivot upon which the smoke consumer will turn, and a handle 15 upon the outer end of the stem 14 provides means for manually manipulating the smoke consumer 12.

The openings 9 shown in Figs. 2 and 3 are rectangular in elevation and the notches 13 shown in Fig. 3 are rectangular in plan and register with the openings 9, so that the draft through the openings 9 will strike the smoke coming upwardly through the notches 13 at right angles and produce a good mixture and good combustion.

The openings 16 shown in Fig. 4 are arranged in rows around the smoke stack 8, the openings of one row being staggered relative to the openings of another row, and the openings being circular so as to make a practically continuous draft of fresh air around the smoke and gas coming upwardly from the tub 1.

The smoke consumer 17 shown in Fig. 5 has a star-shaped central opening 18 adapted to spread the smoke and gas into thin streams presenting a very large surface to the fresh air. The smoke consumer 19 has circular openings 20 arranged in two rows staggered relative to each other so as to break the smoke up into small streams surrounded by fresh air.

In actual practice the orchard heaters are distributed around and through the orchard and the tubs 1 are filled somewhat more than half full of oil 21 having a space 22 between the top of the oil and the bottom of the baffle 6. When the time comes for starting the heaters waste or any sort of kindling may be inserted through the air regulator 4 and lighted and the flame and smoke will pass downwardly under the baffle 6 and upwardly through the openings 7 to the smoke consumer 12 and through the up-draft smoke stack 8.

As the oil ignites and the heat increases smoke is produced and the smoke will strike the smoke consumer 12 and pass upwardly through the notches 13 and fresh air will be drawn downwardly through the flue 11 and through the openings 9 to meet with the smoke above the smoke consumer 12 and fresh air will mix with the smoke and produce a fierce fire directly above the smoke consumer. The inner up-draft smoke stack 8 will become highly heated and fresh air passing downwardly through the flue 11 will be heated before it reaches the combustion chamber.

When the oil 21 becomes low in the tub 1 it is desirable to increase the draft through the air regulator 4 to increase the combustion in the tub, and in order to do this the smoke consumer 12 is turned t- a vertical position more or less thereby allowing more fresh air to pass downwardly into the bottom of the tub to burn the residuum.

If desired the outer down draft flue 11 may be omitted.

In Fig. 7 I have shown a conical casing 23 secured to the up-draft smoke stack 8 above the openings 9 and flaring outwardly and downwardly so as to hold the hot air around the lower end of the smoke stack and direct the hot air into the smoke stack through the openings 9. This construction may be substituted for the other construction wherever desired.

In applying the up-draft smoke stack 8 to the old orchard heaters the lower part of the up-draft smoke stack 8 may be tapered with the large end downwardly to fit the large flues upon the pots or tubs.

The problem is to consume the smoke and make a fierce heat without heating the oil too much at the start, and for this purpose the smoke consumer 12 is of great importance. It is located far enough above the surface of the oil so that the fire upon the surface of the oil may be regulated to vaporize the oil at a comparatively slow speed until the time comes when there is only residuum in the bottom of the tub and then the smoke consumer is manipulated to draw the draft through the tub and increase the combustion in the tub so as to burn the residuum.

Various changes may be made without departing from the spirit of my invention as claimed.

I claim:

1. An orchard heater comprising a closed receptacle adapted to contain oil having an adjustable draft opening, a stack extending upwardly from the top of the receptacle communicating with its interior and having perforations in the lower end above the top of the receptacle, and a perforated diaphragm rotatably mounted transversely in the stack and positioned with the stack perforations above and below the diaphragm and a casing surrounding the stack for preheating the air entering through said slots.

2. In an orchard heater in combination with a closed receptacle adapted to contain oil having an adjustable draft opening, a stack extending upwardly from the top of the receptacle communicating with its interior having slots cut through the wall above the receptacle top and adjacent thereto, and a diaphragm mounted rotatably transversely in the stack positioned at the center of the slots and having notches registering with the slots.

3. An orchard heater comprising a receptacle adapted to contain oil having an adjustable draft opening, a stack extending upwardly from the top of the receptacle communicating with its interior and having slots through the wall adjacent to the top of the receptacle, a diaphragm rotatably mounted in the stack positioned vertically at the center of the slots and having notches registering with the slots of the stack, and a casing surrounding the stack for preheating the air entering through the slots.

4. In an orchard heater, a closed receptacle having an adjustable draft opening, and an outlet, in the top thereof, a stack extending upwardly from said outlet, a baffle depending from the top of the receptacle around said outlet, said stack having perforations in its lower part above the top of the receptacle, and a perforated diaphragm rotatably mounted transversely in the stack and positioned with the stack perforations above and below it.

5. In an orchard heater, a closed receptacle having an adjustable draft opening, an outlet in the top of said receptacle, a stack mounted upon and extending upwardly from said outlet, said stack having apertures in its lower part above the top of the receptacle and a perforated diaphragm mounted transversely in the stack medial of the said apertures, said diaphragm being manually rotatable about a horizontal axis.

6. In an orchard heater, a closed receptacle having an adjustable draft opening and an opening in its top, a stack extending upwardly from the top over said opening, said stack having apertures in its lower part just above the top of the receptacle, and a casing resting upon the top and surrounding said stack, the top of the casing extending a short distance above the top of the apertures in the said stack.

7. In an orchard heater, a closed receptacle having a draft opening and an opening in its top, a stack extending upwardly from the top over said opening, said stack having apertures in its tower walls just above the top of the receptacle, a perforated diaphragm rotatably mounted transversely in the stack, a casing resting upon the top of the receptacle and surrounding the stack, the top of the casing extending above the tops of the apertures in the stack.

8. In an orchard heater, a closed receptacle having an adjustable draft opening and an opening in its top, an imperforate baffle depending from the top around said outlet, a stack extending upwardly from the top over said opening, said stack having apertures in its lower part just above the top of the receptacle, and a casing resting upon the top and surrounding said stack, the top of the casing extending a short distance above the tops of the apertures in the said stack.

9. In an orchard heater, a closed receptacle having a draft opening and an opening in its top, an imperforate baffle depending from the top around said outlet, a stack extending upwardly from the top over said opening, said stack having apertures in its tower walls just above the top of the receptacle, a perforated diaphragm rotatably mounted transversely in the stack, a casing resting upon the top of the receptacle and surrounding the stack, the top of the casing extending above the tops of the apertures in the stack.

In testimony whereof I have signed my name to this specification.

GEORGE L. BLANCHARD.